United States Patent
Olson et al.

(10) Patent No.: US 11,346,571 B2
(45) Date of Patent: May 31, 2022

(54) METHOD FOR CONTROLLING AN AIR CONDITIONING SYSTEM USING AN ECONOMIC BALANCE POINT AND A CAPACITY BALANCE POINT

(71) Applicant: Mitsubishi Electric US, Inc., Cypress, CA (US)

(72) Inventors: Rodney Alan Olson, Suwanee, GA (US); Matthew Wesley Smithson, Atlanta, GA (US); Lebbeous Alexander Fogle-Weekley, Suwanee, GA (US); Asa Paul Freedman, Atlanta, GA (US)

(73) Assignee: Mitsubishi Electric US, Inc., Cypress, CA (US)

( * ) Notice: Subject to any disclaimer, the term of this patent is extended or adjusted under 35 U.S.C. 154(b) by 0 days.

(21) Appl. No.: 16/888,172

(22) Filed: May 29, 2020

(65) Prior Publication Data
US 2021/0372648 A1 Dec. 2, 2021

(51) Int. Cl.
*F24F 11/46* (2018.01)
*F24F 11/67* (2018.01)
(Continued)

(52) U.S. Cl.
CPC ............. *F24F 11/46* (2018.01); *F24F 11/61* (2018.01); *F24F 11/64* (2018.01); *F24F 11/67* (2018.01);
(Continued)

(58) Field of Classification Search
CPC .. F24F 11/46; F24F 11/64; F24F 11/86; F24F 11/67; F24F 11/61; F24F 2140/60;
(Continued)

(56) References Cited

U.S. PATENT DOCUMENTS 5,718,372 A * 2/1998 Tishler ............... F24D 19/1084
236/11
7,085,626 B2 8/2006 Harrod et al.
(Continued)

OTHER PUBLICATIONS

Tung, K., et al. "Experimental and Sensitivity Analysis of a Smart Dual Fuel System in a Net-Zero Energy Home." IOP Conf. Series: Earth and Environmental Science, 238 012018, 2019.

*Primary Examiner* — Jigneshkumar C Patel
(74) *Attorney, Agent, or Firm* — Posz Law Group, PLC

(57) ABSTRACT

A computer-implemented method is provided of controlling a heating, ventilation, and air-conditioning (HVAC) system having a heat pump and an auxiliary heater to heat an inside zone, the method comprising: setting values for an economic balance point and a temperature set point; setting a capacity balance point to be equal to the economic balance point; measuring an initial inside temperature in the inside zone and an outside temperature outside of a structure containing the inside zone; determining that the initial inside temperature is lower than the temperature set point; determining that the outside temperature is greater than the capacity balance point; activating the heat pump to heat the inside zone; waiting a heating interval while the heat pump is active; determining that the heat pump is not effective in heating the inside zone; and setting the capacity balance point to be equal to the outside temperature.

20 Claims, 5 Drawing Sheets

(51) Int. Cl.
    *F24F 11/86*       (2018.01)
    *F24F 11/61*       (2018.01)
    *F24F 11/64*       (2018.01)
    *F24F 110/10*     (2018.01)
    *F24F 110/12*     (2018.01)
    *F24F 140/60*     (2018.01)
    *F25B 30/02*       (2006.01)
    *G05B 19/042*    (2006.01)

(52) U.S. Cl.
    CPC .............. *F24F 11/86* (2018.01); *F25B 30/02* (2013.01); *G05B 19/042* (2013.01); *F24F 2110/10* (2018.01); *F24F 2110/12* (2018.01); *F24F 2140/60* (2018.01); *G05B 2219/2614* (2013.01)

(58) Field of Classification Search
    CPC . F24F 2110/10; F24F 2110/12; G05B 19/042; G05B 2219/2614; F25B 30/02
    USPC ......................................................... 700/276
    See application file for complete search history.

(56) References Cited

U.S. PATENT DOCUMENTS

| | | | |
|---|---|---|---|
| 10,094,586 B2 | 10/2018 | Pavlovski et al. | |
| 2005/0234597 A1* | 10/2005 | Harrod .................... | F24F 11/30 700/276 |
| 2009/0171862 A1* | 7/2009 | Harrod .................... | F24F 11/30 705/412 |
| 2012/0248212 A1 | 10/2012 | Storm et al. | |
| 2019/0338969 A1 | 11/2019 | Hoff | |

* cited by examiner

METHOD FOR CONTROLLING AN AIR CONDITIONING SYSTEM USING AN ECONOMIC BALANCE POINT AND A CAPACITY BALANCE POINT

TECHNICAL FIELD

The disclosed methods relate generally to heat-pump-based heating, ventilation, and air-conditioning (HVAC) systems used to provide heating in very cold environments that employ auxiliary heating elements in addition to a heat pump. More particularly, the disclosed methods relate to the operation of heat-pump-based HVAC systems that employ auxiliary heating elements and use both an economic balance point and a capacity balance point to determine when to turn off the heat pump and activate the auxiliary heating element.

BACKGROUND

A heat pump is a device that transfers heat energy from one area to another. Heat pumps are used in many HVAC systems to provide heating and cooling to a target zone. During a cooling operation the heat pump will transfer heat from the target zone to the outside ambient air, thereby cooling the target zone. Similarly, during a heating operation the heat pump will transfer heat from the ambient outside air to the target zone, thereby heating the target zone.

One reason that heat pumps are used in HVAC systems is that at many temperatures the cost of operating a heat pump is economically attractive compared to other heating and cooling options. For example, a heat pump is more energy efficient in heating an area than an electric heater across a large temperature range. However, as the temperature difference between a target zone and ambient outside air increases, the efficiency of the heat pump drops. Eventually the cost of heating the target zone with the heat pump will rise above the cost of heating the target zone with a different kind of heater.

As a result, many heat pump systems will employ one or more auxiliary heaters in addition to the heat pump. An auxiliary heater could be a gas furnace, an electric heater, or the like. Air conditioning systems used in areas that experience particularly low seasonal temperatures most commonly use auxiliary heaters. For example, heat pump systems used in Canada or the northern part of the United States often include auxiliary heaters.

Air conditioning systems that include an auxiliary heater will typically use the heat pump by preference during a heating operation but will switch to using the auxiliary heater when the temperature drops below a temperature threshold known as an economic balance point. The economic balance point is the point at which the heat pump system estimates that the cost of heating the target zone using the heat pump will rise above the cost of heating the target zone with whatever auxiliary heater the heat pump system employs. The economic balance point will generally be determined based on the parameters of the heat pump and the auxiliary heater, e.g., their efficiency and operating costs at different temperatures.

The economic balance point is an estimate of the outdoor temperature at which it becomes more economical to use the auxiliary heater in place of the heat pump. It is generally calculated when the heat pump system is installed and remains unchanged throughout the operation of the heat pump system. This economic balance point is determined based on the assumption that the heat load of the target zone is highly correlated with outdoor ambient temperatures. However, the heat load may also be correlated with a number of other factors such as the date and time during which the heat pump is operated (due to occupancy differences), the indoor set point in the target zone, the rate of indoor temperature drop during thermal-off conditions, the outdoor humidity, the indoor humidity, the outdoor temperature forecast, appliance use within the target zone (e.g., ovens, space heaters, etc.), whether doors or windows are open in the target zone, and a number of other factors. The economic balance point may therefore not be an accurate measurement of when it becomes more economical to use the auxiliary heater in place of the heat pump under all circumstances.

As a result of the inaccuracy of the economic balance point, the HVAC system may continue to use the heat pump in some circumstances to try and heat the target zone even though those circumstances are such that it is more efficient to use the auxiliary heater. This can unnecessarily increase the operating cost of the HVAC system and/or reduce the ability of the HVAC system to adequately heat the target zone.

It would therefore be desirable to provide an HVAC system that allows for a more accurate and dynamic measure of when it would be more efficient in a heating operation to switch from using a heat pump to heat the target zone to using an auxiliary heater to heat the target zone.

SUMMARY OF THE INVENTION

A computer-implemented method is provided of controlling a heating, ventilation, and air-conditioning (HVAC) system having a heat pump and an auxiliary heater to heat an inside zone during a heating mode, the method comprising: setting values for an economic balance point and a temperature set point; setting a capacity balance point to be equal to the economic balance point; measuring an initial inside temperature in the inside zone and an outside temperature outside of a structure containing the inside zone; determining that the initial inside temperature is lower than the temperature set point; determining that the outside temperature is greater than the capacity balance point; activating the heat pump to heat the inside zone; waiting a heating interval while the heat pump is active; determining that the heat pump is not effective in heating the inside zone; and setting the capacity balance point to be equal to the outside temperature.

The method may further comprise: repeatedly performing the operations of measuring the initial inside temperature and the outside temperature, determining that the initial inside temperature is lower than the temperature set point, determining that the outside temperature is greater than the capacity balance point, activating the heat pump to heat the inside zone, waiting the heating interval while the heat pump is active, determining that the heat pump is not effective in heating the inside zone, and setting the capacity balance point to be equal to the outside temperature.

The heating interval may be between 10 minutes and 30 minutes.

The auxiliary heater may be one of a natural gas furnace, a propane furnace, an oil furnace, an electric heater, a boiler, a radiant heater, and a baseboard heater.

The method may further comprise: resetting a correction timer, determining that a correction time has expired on the correction timer; determining that the capacity balance point is higher than the economic balance point after determining that the correction time has expired; and decreasing the capacity balance point by a temperature increment to a minimum of the economic balance point after determining that the capacity balance point is higher than the economic balance point.

The method may further comprise repeating the operations of resetting the correction timer, determining that the correction time has expired, determining that the capacity balance point is higher than the economic balance point, and decreasing the capacity balance point by a temperature increment.

The correction time may be between 3 and 24 hours.

The temperature increment may be between 0.5° C. and 3° C.

The operation of determining that the heat pump is not effective in heating the inside zone may include: measuring a revised inside temperature of the inside zone after the heat pump has been active for the heating interval; determining a temperature difference between the revised inside temperature and the initial inside temperature; and determining that the temperature difference is lower than a threshold difference.

The operation of determining that the heat pump is not effective in heating the inside zone may include: measuring a revised inside temperature of the inside zone after the heat pump has been active for the heating interval; determining a temperature rate of change from the initial inside temperature to the revised inside temperature; and determining that the temperature rate of change is lower than a threshold rate of change.

The operation of determining that the heat pump is not effective in heating the inside zone may include determining that a temperature droop for the air conditioning system in the inside zone after the heat pump has been active for the heating interval is greater than a threshold droop.

A non-transitory computer-readable medium comprising instructions for execution by a computer is provided, the instructions including a computer-implemented method for controlling an HVAC system having a heat pump and an auxiliary heater for heating an internal zone during a heating mode, the instructions for implementing: setting values for an economic balance point and a temperature set point; setting a capacity balance point to be equal to the economic balance point; measuring an initial inside temperature in the inside zone and an outside temperature outside of a structure containing the inside zone; determining that the initial inside temperature is lower than the temperature set point; determining that the outside temperature is greater than the capacity balance point; activating the heat pump to heat the inside zone; waiting a heating interval while the heat pump is active; determining that the heat pump is not effective in heating the inside zone; and setting the capacity balance point to be equal to the outside temperature.

The instructions may be for further implementing: repeatedly performing the operations of measuring the initial inside temperature and the outside temperature, determining that the initial inside temperature is lower than the temperature set point, determining that the outside temperature is greater than the capacity balance point, activating the heat pump to heat the inside zone, waiting the heating interval while the heat pump is active, determining that the heat pump is not effective in heating the inside zone, and setting the capacity balance point to be equal to the outside temperature.

The heating interval may be between 10 minutes and 30 minutes.

The auxiliary heater may be one of a natural gas furnace, a propane furnace, an oil furnace, an electric heater, a boiler, a radiant heater, and a baseboard heater.

The instructions may be for further implementing: resetting a correction timer; determining that a correction time has expired on the correction timer; determining that the capacity balance point is higher than the economic balance point after determining that the correction time has expired; and decreasing the capacity balance point by a temperature increment to a minimum of the economic balance point after determining that the capacity balance point is higher than the economic balance point.

The instructions may be for further implementing: repeating the operations of resetting the correction timer, determining that the correction time has expired, determining that the capacity balance point is higher than the economic balance point, and decreasing the capacity balance point by a temperature increment.

The correction time may be between 3 and 24 hours.

The temperature increment may be between 0.5° C. and 3° C.

The operation of determining that the heat pump is not effective in heating the inside zone may include: measuring a revised inside temperature of the inside zone after the heat pump has been active for the heating interval; determining a temperature difference between the revised inside temperature and the initial inside temperature; and determining that the temperature difference is lower than a threshold difference.

The operation of determining that the heat pump is not effective in heating the inside zone may include: measuring a revised inside temperature of the inside zone after the heat pump has been active for the heating interval; determining a temperature rate of change from the initial inside temperature to the revised inside temperature; and determining that the temperature rate of change is lower than a threshold rate of change.

The operation of determining that the heat pump is not effective in heating the inside zone may include determining that the temperature droop for the air conditioning system in the inside zone after the heat pump has been active for the heating interval is greater than a threshold droop.

A computer system configured for controlling an HVAC system having a heat pump and an auxiliary heater for heating an internal zone during a heating mode is provided, the system comprising: a memory configured to store data and instructions; and a processor cooperatively operable with the memory, and configured to facilitate: setting values for an economic balance point and a temperature set point; setting a capacity balance point to be equal to the economic balance point; measuring an initial inside temperature in the inside zone and an outside temperature outside of a structure containing the inside zone; determining that the initial inside temperature is lower than the temperature set point; determining that the outside temperature is greater than the capacity balance point; activating the heat pump to heat the inside zone; waiting a heating interval while the heat pump is active; determining that the heat pump is not effective in heating the inside zone; and setting the capacity balance point to be equal to the outside temperature.

The processor may be further configured to facilitate: repeatedly performing the operations of measuring the initial inside temperature and the outside temperature, determining that the initial inside temperature is lower than the temperature set point, determining that the outside temperature is greater than the capacity balance point, activating the heat pump to heat the inside zone, waiting the heating interval while the heat pump is active, determining that the heat pump is not effective in heating the inside zone, and setting the capacity balance point to be equal to the outside temperature.

The heating interval may be between 10 minutes and 30 minutes.

The auxiliary heater may be one of a natural gas furnace, a propane furnace, an oil furnace, an electric heater, a boiler, a radiant heater, and a baseboard heater.

The processor may be further configured to facilitate resetting a correction timer;

determining that a correction time has expired on the correction timer, determining that the capacity balance point is higher than the economic balance point after determining that the correction time has expired; and decreasing the capacity balance point by a temperature increment to a minimum of the economic balance point after determining that the capacity balance point is higher than the economic balance point.

The processor may be further configured to facilitate repeating the operations of resetting the correction timer, determining that the correction time has expired, determining that the capacity balance point is higher than the economic balance point, and decreasing the capacity balance point by a temperature increment.

The correction time may be between 3 and 24 hours.

The temperature increment may be between 0.5° C. and 3° C.

The operation of determining that the heat pump is not effective in heating the inside zone may include: measuring a revised inside temperature of the inside zone after the heat pump has been active for the heating interval; determining a temperature difference between the revised inside temperature and the initial inside temperature; and determining that the temperature difference is lower than a threshold difference.

The operation of determining that the heat pump is not effective in heating the inside zone may include: measuring a revised inside temperature of the inside zone after the heat pump has been active for the heating interval; determining a temperature rate of change from the initial inside temperature to the revised inside temperature; and determining that the temperature rate of change is lower than a threshold rate of change.

The operation of determining that the heat pump is not effective in heating the inside zone may include determining that a temperature droop for the air conditioning system in the inside zone after the heat pump has been active for the heating interval is greater than a threshold droop.

BRIEF DESCRIPTION OF THE DRAWINGS

The accompanying figures, where like reference numerals refer to identical or functionally similar elements and which together with the detailed description below are incorporated in and form part of the specification, serve to further illustrate an exemplary embodiment and to explain various principles and advantages in accordance with the present disclosure.

DETAILED DESCRIPTION

HVAC Unit Having Both a Heat Pump and an Auxiliary Heater

Figure 1:
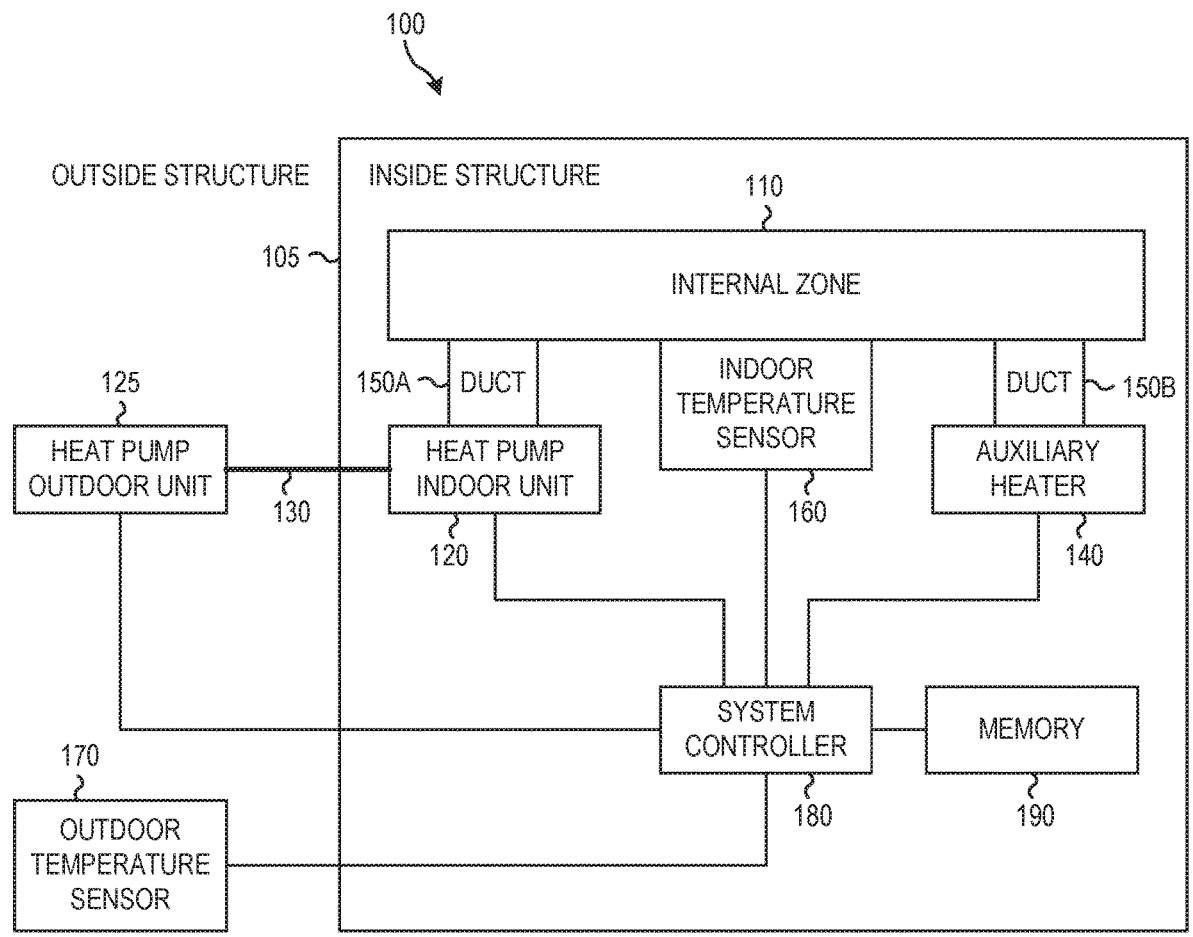
FIG. 1 is a diagram of an HVAC system having a heat pump and an auxiliary heater according to disclosed embodiments.

FIG. 1 is a diagram of an HVAC system 100 having a heat pump 125, 120, 130 and an auxiliary heater 140 according to disclosed embodiments.

As shown in FIG. 1, the HVAC system 100 includes a heat pump indoor unit 120, a heat pump outdoor unit 125, heat pump connections 130, an auxiliary heater 140, one or more first ducts 150A, one or more second ducts 150B, an indoor temperature sensor 160, an outdoor temperature sensor 170, a system controller 180, and a memory 190. The heat pump indoor unit 120, heat pump outdoor unit 125, and heat pump connections 130 can together be considered to make up a heat pump. The heat pump indoor unit 120, an auxiliary heater 140, one or more first ducts 150A, one or more second ducts 150B, indoor temperature sensor 160, system controller 180, memory 190, and a portion of the heat pump connections 130 are formed inside a structure 105 that contains an internal zone 110 that must be heated or cooled. The heat pump outdoor unit 125, the outdoor temperature sensor 170, and a portion of the heat pump connections 130 are formed outside the structure 105.

The structure 105 can be a building or other enclosed space that contains the internal zone 110, the heat pump indoor unit 120, the auxiliary heater 140, the ducts 150A, 150B, the indoor temperature sensor 160, the system controller 180, the memory 190, and a portion of the heat pump connections 130.

The internal zone 110 represents one or more areas within the structure 105 whose internal temperature needs to be regulated. The internal zone 110 could be a single room, a series of rooms, or any combination of areas to be heated or cooled.

The heat pump indoor unit 120 represents the portion of a heat pump that is located inside of the structure 105. Typically this includes an indoor coil for circulating a heated or cooled refrigerant and an air handler for drawing return air from the internal zone 110, passing the return air over the indoor coil to transfer heat between the return air and the refrigerant passing through the indoor coil to generate conditioned supply air, and providing the conditioned supply air back to the internal zone 110.

The heat pump outdoor unit 125 represents a portion of the heat pump that is located outside of the structure 105. Typically, the heat pump outdoor unit 125 includes a compressor that circulates refrigerant and a mechanism that allows the refrigerant to exchange heat with ambient air outside of the structure 105.

The heat pump connections 130 include refrigerant tubes that allow the refrigerant to flow between the heat pump indoor unit 120 and the heat pump outdoor unit 125. The heat pump connections 130 may also include control or power connections between the heat pump indoor unit 120 and the heat pump outdoor unit 125.

In operation, the heat pump outdoor unit 125 heats or cools the refrigerant based on whether the heat pump 120, 125, 130 is performing a heating or cooling operation by exchanging heat between the refrigerant and the ambient air outside the structure 105. The heat pump outdoor unit 125 then passes the heated or cooled refrigerant over the heat pump connections 130 to the heat pump indoor unit 120. The heat pump indoor unit 120 then exchanges heat between the refrigerant and returned air drawn from the internal zone 110 to heat or cool the return air, provides the conditioned return air to the internal zone 110 as supply air, and returns the refrigerant back to the heat pump outdoor unit 125 over the heat pump connections 130 so that the refrigerant can be reheated or recooled, as appropriate.

In cold-weather climates, it often takes a very large heat pump 120, 125, 130 to have enough capacity to economically heat the internal zone 110 at the extremely low temperatures that can occur at certain times of the year (e.g., winter in the northern hemisphere). A much smaller heat pump 120, 125, 130 will typically be required in these cold-weather climates to cool the internal zone 110 during the warmer parts of the year (e.g., summer in the northern hemisphere). As a result, many building owners and operators choose a heat pump size for their HVAC system based on their expected cooling load during warm weather rather than based on their expected heating load during cold weather. Choosing a comparatively smaller heat pump 120, 125, 130 can also help increase the efficiency of dehumidification operations performed by the heat pump 120, 125, 130 during warm weather.

This means that many structures 105 in cold-weather climates have a heat pump 120, 125, 130 that has a smaller capacity than would be necessary to properly heat an internal zone 110 to typical setpoint temperatures during the lower outdoor temperatures those cold-weather climates may experience during the coldest parts of the year.

For such smaller-capacity heat pumps 120, 125, 130, when the ambient temperature outside the structure 105 drops to far below the temperature set point for the internal zone, the efficiency of the heat pump indoor unit 120 can drop low enough that it becomes increasingly expensive to operate the heat pump 120, 125, 130 to heat the internal zone 110. As the outdoor ambient temperature continues to drop, the heat pump 120, 125, 130 may even reach a point at which it becomes incapable of heating the internal zone 110 to the desired temperature set point during a heating operation. For this reason, an auxiliary heater 140 is often provided to heat the internal zone 110 when it no longer is economically efficient or is not even possible for the heat pump 120, 125, 130 to heat the internal zone 110.

The auxiliary heater 140 is a heating element that is provided to heat the internal zone 110 in place of or in addition to the heat pump during a heating operation. In some HVAC systems the auxiliary heater 140 can be operated alongside the heat pump 120, 125, 130 to augment the heating operation of the heat pump 120, 125, 130. Other HVAC systems are designed such that the heat pump 120, 125, 130 and the auxiliary heater 140 are not operated at the same time but are operated in the alternative. Systems using an A-coil heat pump typically fall into this latter category.

Some examples of auxiliary heaters 140 are a natural gas furnace, a propane furnace, an oil furnace, an electric heater, a boiler, a radiant heater, and a baseboard heater. However, this list is not meant to be exhaustive. The auxiliary heater 140 can be any device that can heat the internal zone 110 more efficiently than a heat pump 120, 125, 130 at low temperatures.

The one or more first ducts 150A include one or more ducts that connect the heat pump indoor unit 120 to the internal zone 110. The ducts 150A can include one or more return ducts that draw return air from the internal zone 110 to be supplied to the heat pump indoor unit 120 for conditioning and one or more supply ducts that provide supply air conditioned by the heat pump indoor unit 120 back to the internal zone 110.

The one or more second ducts 150B include one or more ducts that connect the auxiliary heater 140 to the internal zone 110. The ducts 150B can include one or more return ducts that draw return air from the internal zone 110 to be supplied to the auxiliary heater 140 for heating and one or more supply ducts that provide supply air heated by the auxiliary heater 140 back to the internal zone 110.

In various embodiments the one or more first ducts 150A and the one or more second ducts 150B can include some overlap. In other words, there may be some ducts connected to the internal zone 110 that form both part of the one or more first ducts 150A and part of the one or more second ducts 150B. For example, one embodiment could employ a heat pump indoor unit 120 with an A-coil and a furnace as the auxiliary heater 140. In such an embodiment the heat pump indoor unit 120 and the auxiliary heater 140 could share ducts 150.

Although the embodiment of FIG. 1 includes one or more first ducts 150A and one or more second ducts 150B, this is by way of example only. Alternate embodiments can omit either the first ducts 150A, the second ducts 150B, or both. Other embodiments need not share ducts 150 between the heat pump 120, 125, 130 and the auxiliary heater 140.

For example, in some embodiments the heat pump indoor unit 120 could be wall mount unit or the like that is located inside the internal zone 110 and so has no need for a first duct 150A. Similarly, in some embodiments the auxiliary heater 140 could be a baseboard heater or the like that is located inside the internal zone 110 and so has no need for second ducts 150B.

The indoor temperature sensor 160 is a temperature sensor located in the internal zone 110 and is configured to measure the temperature in the internal zone 110. In various embodiments the indoor temperature sensor 160 can be a single temperature sensing device that measures the temperature at a single point in the internal zone 110, or a plurality of temperature sensing devices that measure the temperature at multiple points in the internal zone 110 and then use those multiple temperature readings to estimate temperature for the internal zone 110 in general. This could involve using some sort of weighted average of the multiple temperature readings.

In various embodiments the indoor temperature sensor 160 can be a negative temperature coefficient (NTC) thermistor, a resistance temperature detector (RTD), a thermocouple, a semiconductor-based sensor, or any suitable sensor that can accurately measure the temperature of the internal zone 110.

The outdoor temperature sensor 170 is a temperature sensor located outside of the structure 105 and is configured to measure the ambient temperature outside of the structure 105. In various embodiments the outdoor temperature sensor 170 can be a single temperature sensing device that measures the temperature at a single point outside the structure 105, or a plurality of temperature sensing devices that measure the temperature at multiple points in outside the structure 105 and then use those multiple temperature readings to estimate ambient temperature outside the structure 105. This could involve using some sort of weighted average of the multiple temperature readings.

In various embodiments the outdoor temperature sensor 170 can be a negative temperature coefficient (NTC) thermistor, a resistance temperature detector (RTD), a thermocouple, a semiconductor-based sensor, or any suitable sensor that can accurately measure the temperature of the internal zone 110. Other embodiments may also measure outdoor temperature via accessing a temperature service that provides current outdoor temperatures in that area.

In some embodiments the outdoor temperature sensor 170 can be built into the heat pump outdoor unit 125. Other embodiments could have the outdoor temperature sensor 170 be separate from the heat pump indoor unit 125.

The system controller 180 controls the operation of the HVAC system 100 based on information and programs stored in firmware and in the memory 190. It may comprise one or more microprocessors and/or one or more digital signal processors. It may also include one or more internal memory structures.

The memory 190 may be coupled to the system controller 180 and may comprise a read-only memory (ROM), a random-access memory (RAM), a programmable ROM (PROM), and/or an electrically erasable read-only memory (EEPROM). The memory 190 may include multiple memory locations for storing, among other things, an operating system, programs to be executed by the system controller 180, data and variables for programs executed by the system controller 180, and system and environmental data and parameters. Such programs can include programs for monitoring the operation of the heat pump 120, 125, 130. The computer programs may be stored, for example, in ROM or PROM and may direct the system controller 180 in controlling the operation of the HVAC system 100. Each of these functions is considered in more detail herein, to the extent that it is not detailed elsewhere in this document. The system and environmental data may include an economic balance point, a capacity balance point, a temperature set point, a plurality of indoor and outdoor temperatures along with time and date information identifying when the indoor or outdoor temperatures were measured, temperature droop data for the HVAC system, temperature rate-of-change data, various timing, temperature range, and threshold data, etc.

Responsive to manual signaling from a user in accordance with instructions stored in memory 190 and/or automatically, the system controller 180 may direct the execution of the stored programs.

In HVAC systems that employ the heat pump 120, 125, 130 and the auxiliary heater 140 in the alternative, a system controller 180 determines during a heating mode of operation when to switch from heating the internal zone 110 using the heat pump 120, 125, 130 and heating the internal zone 110 using the auxiliary heater 140. The disclosed system performs this operation by determining when it is more efficient to use the heat pump 120, 125, 130 to heat the internal zone 110 and when it is more efficient to use the auxiliary heater 140 to heat the internal zone 110. When the system controller 180 determines that it is more efficient to use the heat pump 120, 125, 130 to heat the internal zone 110, it activates the heat pump 120, 125, 130 and deactivates the auxiliary heater 140. Similarly, when the system controller 180 determines that it is more efficient to use the auxiliary heater 140 to heat the internal zone 110, it deactivates the heat pump 120, 125, 130 and activates the auxiliary heater 140.

The system controller 180 makes the determination as to which of the heat pump 120, 125, 130 and the auxiliary heater 140 would be most efficient at heating the internal zone 110 using temperature data received from the indoor temperature sensor 160 and the outdoor temperature sensor 170, a stored economic balance point determined based on the known device parameters of the heat pump 120, 125, 130 and the auxiliary heater 140, a stored temperature set point for the HVAC system 100 set by a system operator, and a capacity balance point that is repeatedly updated based upon operational and environmental parameters measured and determined by the system controller 180 during operation.

The capacity balance point represents a more accurate estimate than the economic balance point of the outdoor ambient temperature at which it would be more efficient to use the auxiliary heater 140 to heat the internal zone 110 than to use the heat pump 120, 125, 130 to heat the internal zone 110. The capacity balance point reflects the outdoor temperature at which the heat pump does not have the capacity to adequately heat the internal space 110.

In operation, the system controller 180 activates the auxiliary heater 140 and deactivates the heat pump 120, 125, 130 whenever the external ambient temperature is measured to be lower than or equal to the capacity balance point. Similarly, the system controller activates the heat pump 120, 125, 130 and deactivates the auxiliary heater 140 whenever the external ambient temperature is measured to be greater than the capacity balance point. The stored economic balance point is used both as a starting point for the capacity balance point and as a floor for the value that the capacity balance point can take.

The processor 180 may be programmed to set values for an economic balance point and a temperature set point for the HVAC system 100. These values for the economic balance point and the temperature set point can be stored in the memory 190.

The processor 180 may be programmed to set a capacity balance point to be equal to the economic balance point at the start of operation. This value for the capacity balance point can be stored in the memory 190.

The processor 180 may be programmed to measure an inside temperature in the inside zone 110 using the indoor temperature sensor 160 and to measure an outside temperature outside of the structure 105 containing the inside zone 110 using the outdoor temperature sensor 170.

The processor 180 may be programmed to monitor the inside temperature received from the indoor temperature sensor 160 to determine whether the measured inside temperature is lower than the stored temperature set point.

The processor 180 may be programmed to determine whether the measured outside temperature received from the outside temperature sensor 170 is greater than the stored capacity balance point.

The processor 180 may be programmed to deactivate the auxiliary heater 140 and activate the heat pump 120, 125, 130 to heat the inside zone 110 when it determines that the measured inside temperature is lower than the stored temperature set point and the measured outside temperature is greater than the stored capacity balance point.

The processor 180 may be programmed to wait a heating interval after deactivating the auxiliary heater 140 and activating the heat pump 120, 125, 130 while the heat pump 120, 125, 130 is active.

The processor 180 may be programmed to determine whether the heat pump 120, 125, 130 is effective in heating the inside zone 110. This determination can be performed in different ways based on different operational and environmental parameters or combinations of parameters.

The processor 180 may be programmed to set the capacity balance point to be equal to the measured outside temperature after determining that the heat pump 120, 125, 130 is not effective in heating the inside zone 110. The updated capacity balance point can be stored in the memory 190.

The processor 180 may be programmed to repeatedly: measure the inside temperature using the indoor temperature sensor 160 and the outside temperature using the outdoor temperature sensor 170, determine whether the initial inside temperature is lower than the stored temperature set point, determine whether the outside temperature is greater than the stored capacity balance point, deactivate the auxiliary heater 140 and activate the heat pump 120, 125, 130 to heat the inside zone 110 when it determines that the measured inside temperature is lower than the stored temperature set point and the measured outside temperature is greater than the stored capacity balance point, wait for the heating interval while the heat pump 120, 125, 130 is active, determine whether the heat pump 120, 125, 130 is effective in heating the inside zone 110, set the capacity balance point to be equal to the measured outside temperature when it determines that the heat pump 120, 125, 130 is not effective in heating the inside zone 110, and store the updated capacity balance point in the memory 190.

In some embodiments the heating interval is between 10 minutes and 30 minutes. However, this is by way of example only. Alternate embodiments can use a heating interval below 10 minutes or a heating interval above 30 minutes.

The processor 180 may include a correction timer (not shown) to monitor the duration of time since the correction timer was reset. This timer may be any kind of clock or timer that can be used in a control system. It could be an external clock, a counter that relies on a system clock in the system controller 180, or any suitable circuit for measuring the passage of time.

The processor 180 may be programmed to reset the correction timer, measure a correction time on the correction timer to determine whether the correction time has expired, determine whether the capacity balance point is higher than the economic balance point after determining that the correction time has expired, decrease the capacity balance point by a temperature increment to a minimum of the economic balance point after determining that the capacity balance point is higher than the economic balance point, and store the updated capacity balance point in the memory 190.

The processor 180 may be programmed to repeatedly: reset the correction timer, determine whether the correction time has expired, determine whether the capacity balance point is higher than the economic balance point, decrease the capacity balance point by a temperature increment after determining that the capacity balance point is higher than the economic balance point, and store the updated capacity balance point in the memory 190.

In some embodiments the correction time is between 3 and 24 hours. However, this is by way of example only. Alternate embodiments can use a correction time below 3 hours or a correction time above 24 hours.

In some embodiments the temperature increment is between 0.5° C. and 3° C. However, this is by way of example only. Alternate embodiments can use a temperature increment below 0.5° C. or a temperature increment above 3° C.

When determining whether the heat pump 120, 125, 130 is effective in heating the inside zone 110, the processor 180 may use a variety of possible parameters. For example, it could use a temperature difference between a measured inside temperature and a stored inside temperature, a temperature rate of change for the internal zone 110 over a time interval, a temperature droop for the air conditioning system 100 over a time interval, or a combination of these parameters. In addition, alternate embodiments can employ other parameters that are determined to correlate with whether the heat pump 120, 125, 130 is effective in heating the inside zone 110.

If the parameter of a temperature difference between a measured inside temperature and a stored inside temperature is used, the processor 180 may be programmed to use the indoor temperature sensor 160 to measure a revised inside temperature of the inside zone 110 after the heat pump 120, 125, 130 has been active for the heating interval, determine a temperature difference between the revised inside temperature and the stored inside temperature (the initial inside temperature), and determining whether the temperature difference is lower than a threshold difference.

If the parameter of a temperature rate of change between a measured inside temperature and a stored inside temperature is used, the processor 180 may be programmed to use the indoor temperature sensor 160 to measure a revised inside temperature of the inside zone after the heat pump has been active for the heating interval, determine a temperature rate of change from the stored inside temperature (the initial inside temperature) to the revised inside temperature, and determine whether the temperature rate of change is lower than a threshold rate of change.

If the parameter of a temperature droop for the HVAC system is used, the processor 180 may be programmed to determine the temperature droop in inside zone 110 and determine whether the temperature droop in the inside zone 110 after the heat pump 120, 125, 130 has been active for the heating interval is greater than a threshold droop.

Figure 2:
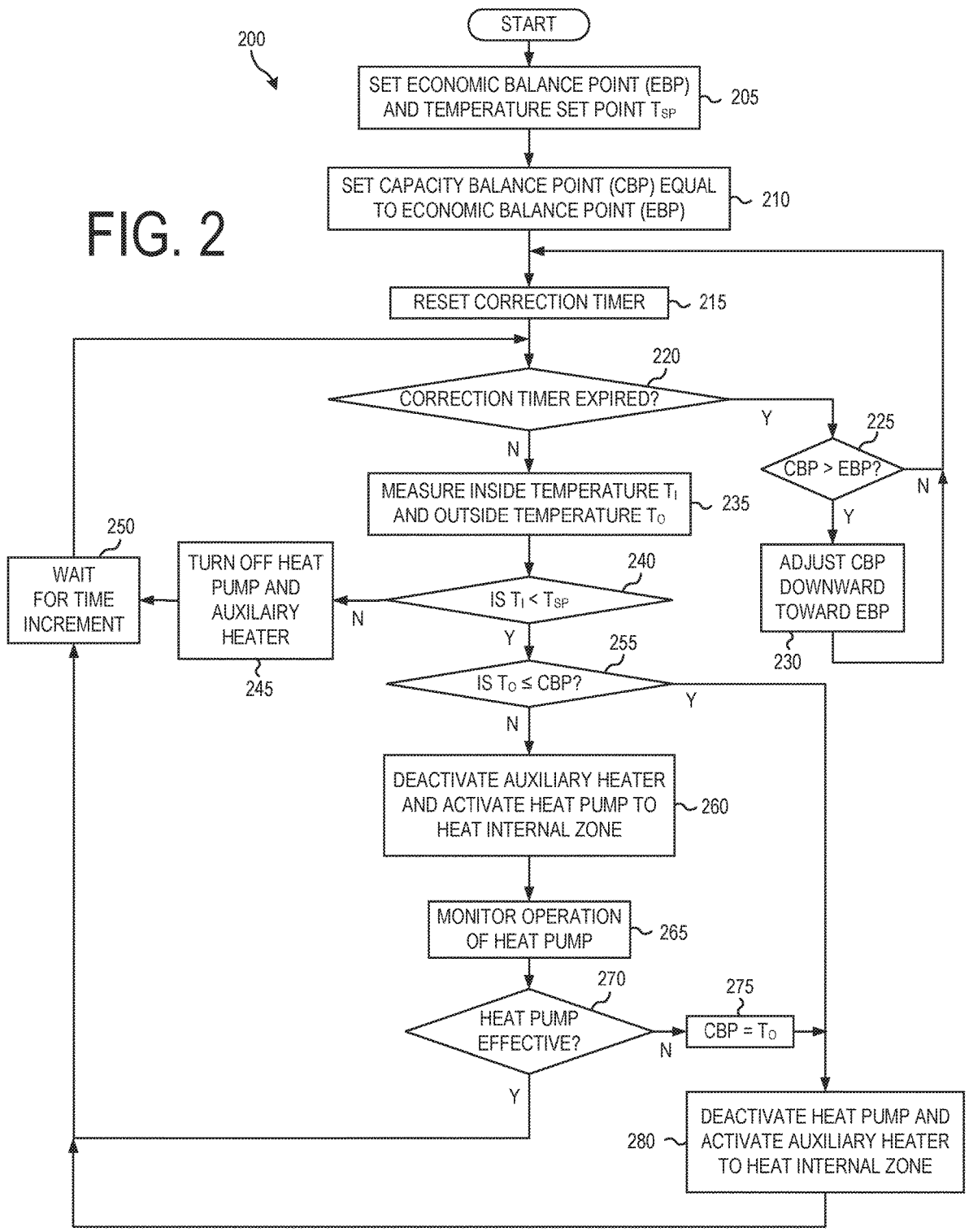
FIG. 2 is a flow chart of a heating operation for controlling an HVAC system having a heat pump and an auxiliary heater according to disclosed embodiments.

Method of Operating an HVAC Unit Having Both a Heat Pump and an Auxiliary Heater FIG. 2 is a flow chart of a heating operation 200 for controlling an HVAC system 100 having a heat pump 120, 125, 130 and an auxiliary heater 140 according to disclosed embodiments.

In this heating operation 200, a capacity balance point (CBP) value will be initially set and then repeatedly updated based on measured environmental parameters. The CBP will then be used to control operation of the HVAC system 100, specifically whether an internal zone 110 will be heated using a heat pump 120, 125, 130 or using an auxiliary heater 140.

In addition to modifying the CBP based on measured environmental parameters, the operation 200 will also periodically adjust the CBP downward over time in a correction operation to make certain the CBP does not unnecessarily creep too high over time.

As shown in FIG. 2, operation begins by setting an economic balance point (EBP) and a temperature set point $T_{SP}$. (205) When these values are set, they can be stored in a memory 190.

The EBP is a temperature value. It represents the outside ambient temperature at which it is estimated that it will be more efficient to heat an internal zone 110 using an auxiliary heater 140 as compared to heating the internal zone 110 using a heat pump 120, 125, 130. The EBP is determined based on parameters relating to the design of the auxiliary heater 140 and the heat pump 120, 125, 130. It is typically stored in the memory proximate to installation of the HVAC system and rarely, if ever, changes during the lifetime of the HVAC system 100.

The temperature set point $T_{SP}$ represents a desired temperature at which a system operator would like to keep the air in the internal zone 110 serviced by the HVAC system 100.

A capacity balance point (CBP) is then set to be equal to the EBP. (210) When this value is set, it can be stored in a memory 190. In this way, the starting value of the CBP in this method is set to be equal to the EBP.

The CBP is a temperature value. It represents a changeable estimate of the outside ambient temperature at which it is expected that it will be more efficient to heat an internal zone 110 using an auxiliary heater 140 as compared to heating the internal zone 110 using a heat pump 120, 125, 130. The CBP is altered based on dynamic system and environmental parameters such as the current outside temperature $T_O$ outside of a structure 105 that includes the internal zone 110, the current inside temperature $T_I$ in the internal zone 110 to be heated, an amount that the inside temperature $T_I$ has changed over time, a rate of change of the inside temperature $T_I$ over time, a droop of the internal zone after a time interval, or any other parameter that could be used as an indicator of the efficiency of a heat pump 120, 125, 130. In addition, a combination of one or more of these parameters can be used to refine the CBP.

Once the EBP, the temperature set point $T_{SP}$, and the CBP have all been set (205, 210), a correction timer is reset to zero. (215) This correction timer can be a part of a system controller 180 or can be a separate timer.

The system will then determine whether the correction timer has expired. (220) the correction timer will expire when the timer reaches a set correction expiration time. The correction expiration time represents a length of time after which the system will adjust the CBP downward to prevent it from unnecessarily creeping too high.

Without the correction operation, the CBP has no way of being reduced. It could be adjusted upward and then circumstances could change warranting the CBP having a lower value. By periodically adjusting the CBP downward in a correction operation, the system makes certain that the CBP will have an opportunity to drop as well as rise.

In some embodiments, the correction time can be between 3 and 24 hours, though this is by way of example only. Alternate correction times can be used in other embodiments.

If the correction timer has expired (220), the operation 200 will perform a CBP correction process by lowering the CBP downward to a floor value of the EBP. The CBP is lowered during the correction process to prevent it from rising higher than is appropriate. The EBP is used as a floor value to prevent the CBP from dropping lower than is appropriate. If this CBP is too high, then the operation 200 might turn off the heat pump 120, 125, 130 and turn on the auxiliary heater 140 at a temperature at which it would still be more efficient to use the heat pump 120, 125, 130. Likewise, if the CBP is too low, then the operation 200 might turn on the heat pump 120, 125, 130 and turn off the auxiliary heater 140 when it would be more efficient to use the auxiliary heater 140.

The operation 200 starts the CPB adjustment process by determining whether the CBP is greater than the EBP. (225) in other words, the operation 200 determines whether the CBP is above the floor value of the EBP.

If the operation 200 determines that the CBP is greater than the EBP, the operation 200 adjusts the CBP downward by subtracting a temperature increment as a correction value from the CBP. (230) this correction of the CBP downward cannot take the CBP any lower than the EBP. If the subtraction of the temperature increment from the CBP would make the corrected CBP lower than the EBP, then the CBP will be set to be equal to the EBP. The temperature increment can be a constant value used throughout the operation 200, or it can be a variable temperature increment determined based on variable parameters such as the difference between the CBP and the EBP.

In some embodiments the temperature increment will be between 0.5° C. and 3° C. However, this is by way of example only. Alternate embodiments can use a temperature increment below 0.5° C. or a temperature increment above 3° C.

Once it is either determined that the CBP is not greater than the EBP (225) or the CBP is adjusted downward by the temperature increment (230), the operation 200 will return to resetting the correction timer (215) and continue processing from there.

If the correction timer was not expired when it was checked (220), the operation 200 will measure an inside temperature $T_I$ inside the internal zone 110 and an outside temperature $T_O$ outside the structure 105. (235) These measurements may be performed using an indoor temperature sensor 160 and an outdoor temperature sensor 170. However, any suitable way of determining these two temperatures can be used in alternate embodiments. For example, one or both temperature values $T_I$, $T_O$ could be obtained from a device that is not part of the HVAC system, from the Internet, etc.

The operation 200 then determines whether the inside temperature $T_I$ is lower than the temperature set point $T_{SP}$. (240) In other words, the operation 200 determines whether the internal zone 110 is colder than the user of the HVAC system 100 would like it to be, and is in need of heating.

If the inside temperature $T_I$ is not lower than the temperature set point $T_{SP}$, i.e., if the internal zone 110 is sufficiently warm and not in need of heating, the operation 200 turns off the heat pump 120, 125, 130 and the auxiliary heater 140. (245) In other words, the system stops heating the internal zone 110. In this operation 200, if either the heat pump 120, 125, 130 or the auxiliary heater 140 are already deactivated, they will simply be maintained in an off state.

The operation 200 then waits for a time increment (250) before returning to determine whether the correction timer has expired (220). The operation 200 then continues from that point.

If, however, the inside temperature $T_I$ is lower than the temperature set point $T_{SP}$, i.e., if the internal zone 110 is cold enough that it requires heating, the operation 200 will determine whether the measured outside temperature $T_O$ is less than or equal to the CBP. (255) In other words, the operation 200 will determine whether circumstances are such that the current CBP value indicates that would be economical to heat the internal zone 110 using the auxiliary heater 140 rather than the heat pump 120, 125, 130.

If the operation 200 determines that the measured outside temperature $T_O$ is not less than or equal to the CBP (255), i.e., the outside temperature $T_O$ is high enough that it is considered more efficient to use the heat pump 120, 125, 130 to heat the internal zone 110, then the operation 200 will deactivate the auxiliary heater 140 and activate the heat pump 120, 125, 130 to heat the internal zone 110. (260) In this case if the auxiliary heater 140 is already off the operation 200 will simply maintain the auxiliary heater 140 in the off state. Likewise, if the heat pump 120, 125, 130 is already on, the operation 200 will simply maintain the heat pump 120, 125, 130 in the on state.

The operation 200 will then monitor the operation of the heat pump 120, 125, 130. (265) This involves gathering or calculating certain environmental and/or system parameters regarding the operation of the heat pump 120, 125, 130 such as values over time of the inside temperature $T_I$ of the internal zone 110, a temperature droop of the internal zone 110 over time, a change in the inside temperature $T_I$ over time, a rate of change of the inside temperature $T_I$ over time, etc. This information may be stored in a memory 190.

The operation 200 then uses the information gathered about the operation of the heat pump 120, 125, 130 to determine whether the heat pump 120, 125, 130 is effectively heating the internal zone 110. (270) In this way the operation 200 can determine whether the currently stored CBP value is too low. In other words, the operation can determine whether the HVAC system 100 is keeping the heat pump 120, 125, 130 operating even when it is not effectively or economically heating the internal zone 110.

If the operation 200 determines that the heat pump is not being effective (270), it will set the CBP to be equal to the current outside temperature $T_O$. (275) This new CBP represents a revised estimate of the temperature at which it becomes more cost effective to heat the internal zone using the auxiliary heater 140 rather than the heat pump 120, 125, 130. The operation 200 then deactivates the heat pump 120, 125, 130 and activates the auxiliary heater 140 to heat the internal zone 110. (280) In this operation 200, if the heat pump 120, 125, 130 is already deactivated, the operation 200 will simply maintained it in an off state. Likewise, if the auxiliary heater 140 is already activated, the operation 200 will simply maintain it in an on state.

By raising the value of the CBP to the current outside temperature $T_O$, the operation 200 will raise the temperature at which it will switch to using the auxiliary heater 140 to heat the internal zone 110 in later determinations as to which heating option to use (255).

After deactivating the heat pump 120, 125, 130 and activating the auxiliary heater 140, the operation 200 proceeds to wait for the time increment (250) and continues processing.

If, however, the operation 200 determines that the heat pump 120, 125, 130 is effective in heating the internal zone 110 (270), then the operation 200 will simply proceed to wait for the time increment (250) and continue processing. In this case the heat pump 120, 125, 130 will remain in on state and the auxiliary heater 140 will remain in an off state.

By repeatedly monitoring the effectiveness of the heat pump 120, 125, 130 (265, 270) when the relative values of the outside temperature $T_O$ and the CBP indicate that it is still efficient to use the heat pump 120, 125, 130, the operation 200 can make certain that the stored value for CBP remains an accurate estimate of the outside temperature at which it becomes more efficient to heat the internal zone 110 with the auxiliary heater 140 rather than the heat pump 120, 125, 130.

Returning to the operation of determining whether the measured outside temperature $T_O$ is less than or equal to the CBP (255), if this operation determines that the measured outside temperature $T_O$ is less than or equal to the CBP, i.e., the outside temperature $T_O$ is low enough that it is considered more efficient to use the auxiliary heater 140 to heat the internal zone 110 rather than the heat pump 120, 125, 130, then the operation 200 will deactivate the heat pump 120, 125, 130 and activate the auxiliary heater 140 to heat the internal zone 110. (280) Again, if the auxiliary heater 140 is already on, the operation 200 will simply maintain the auxiliary heater 140 in the on state. Likewise, if the heat pump 120, 125, 130 is already off, the operation 200 will simply maintain the heat pump 120, 125, 130 in the off state.

The operation 200 can therefore adjust the CBP up and down over time to maintain a dynamic estimate of the outside temperature $T_O$ at which it becomes more efficient to heat the internal zone 110 with the auxiliary heater 140 rather than the heat pump 120, 125, 130. The operation will increase the CBP when it determines that the heat pump 120, 125, 130 is not effectively heating the internal zone 110, and it will decrease the CBP over time to make certain that it does not creep up too high. In this way, the CBP can be maintained at a value closer to an actual true balance point and should provide a more accurate estimate than the EBP of the outside temperature $T_O$ at which it becomes more efficient to heat the internal zone 110 with the auxiliary heater 140 rather than the heat pump 120, 125, 130. Thus, by repeatedly updating the CBP and then using the CBP to trigger a switch between operating the heat pump 120, 125, 130 and operating the auxiliary heater 140, the HVAC system 100 can provide for a more efficient heating operation.

Monitoring Operation of the Heat Pump—First Disclosed Embodiments

Figure 3:
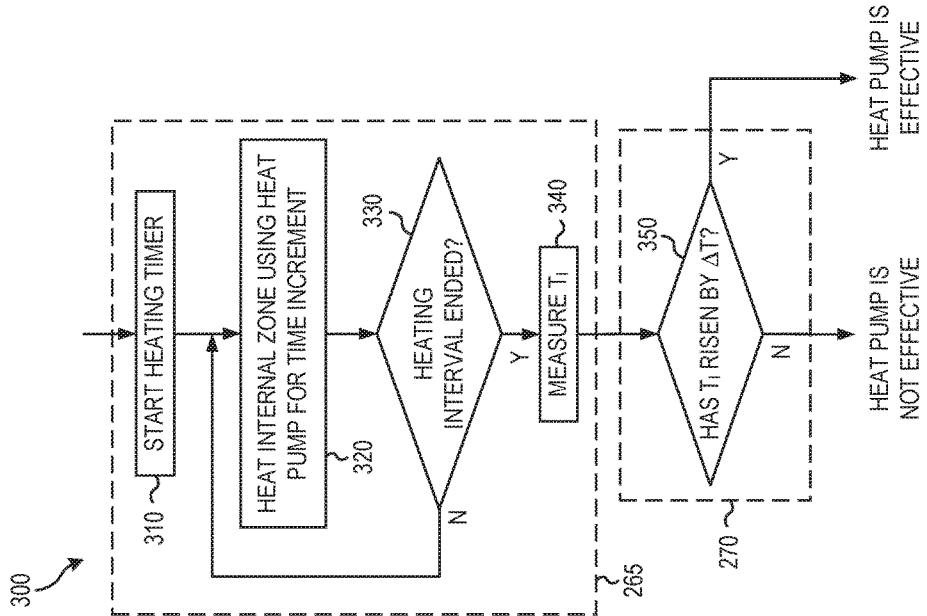
FIG. 3 is a flow chart showing the operations of monitoring the operation of the heat pump and determining whether the heat pump is still effective in heating the internal zone according to first disclosed embodiments.

FIG. 3 is a flow chart 300 showing the operations of monitoring the operation of the heat pump 120, 125, 130 (265) and determining whether the heat pump 120, 125, 130 is still effective in heating the internal zone 110 (275) according to first disclosed embodiments.

As shown in FIG. 3, the process of monitoring the operation of the heat pump 120, 125, 130 (265) begins by starting a heating timer. (310) This heating timer may be internal to a system controller 180 or could be a separate clock circuit.

After starting the heating timer (310), the operation 265 heats the internal zone 110 using a heat pump 120, 125, 130 for a time increment. (320) This time increment may be of a different duration than the time increment used in operation 250.

After the end of the time increment, the operation 265 determines whether a heating interval has ended. (330) The heating interval is typically made up of multiple time increments.

If the heating interval has not ended, the operation 265 heats the internal zone 110 using the heat pump 120, 125, 130 for another time increment (320) and again determines whether the heating interval has ended (330).

If, however, the heating interval has ended, the operation 265 measures a current value for the inside temperature $T_I$. (340) This current inside temperature $T_I$ can be measured by an indoor temperature sensor 160 and can be stored in a memory 190. This current inside temperature $T_I$ can be stored in the memory 190 in addition to a previous inside temperature $T_I$ already stored in the memory 190.

By repeating the operation of heating the internal zone 110 using the heat pump 120, 125, 130 for the time increment until the heating interval has ended, the operation 265 can make certain it performs a heating operation using the heat pump 120, 125, 130 for the entire heating interval. This provides a sample duration during which the heat pump 120, 125, 130 is acting to heat the internal zone 110.

Furthermore, while the monitoring operation 265 measures a value for the current inside temperature $T_I$, the greater heating operation 200 should also retain a stored value of a previous inside temperature $T_I$ from before the heating interval (as measured in operation 235). Thus, the operation 200 will have both a pre-interval inside temperature $T_{I-PRE}$ and a post-interval inside temperature $T_{I-POST}$ available for analysis.

The operation of determining whether the heat pump 120, 125, 130 is effectively heating the internal zone 110 (270) is implemented by determining whether the value of the inside temperature $T_I$ has risen by a given temperature increment $\Delta T$ over the course of the heating interval. (350) In other words, the operation 270 determines whether $(T_{I-POST}-T_{I-PRE}) \geq \Delta T$. This essentially determines whether the heat pump 120, 125, 130 has been able to raise the temperature in the internal zone 110 by the at least the temperature increment $\Delta T$ over the heating interval.

The temperature increment $\Delta T$ may be between 0.5° C. and 3° C. in various embodiments. However, this is by way of example only. Alternate embodiments can use a temperature increment $\Delta T$ that is lower than 0.5° C. or higher than 3° C. Furthermore, the temperature increment $\Delta T$ may vary depending upon what the heating interval is. A longer heating interval may require a higher temperature increment $\Delta T$ to prove that the heat pump 120, 125, 130 is effectively heating the internal zone 110.

If the inside temperature $T_I$ has risen by at least the temperature increment $\Delta T$ over the course of the heating interval, then it is determined that the heat pump 120, 125, 130 is effectively heating the internal zone 110. If, however, the inside temperature $T_I$ has not risen by the temperature increment $\Delta T$ over the course of the heating interval, then it is determined that the heat pump 120, 125, 130 is not effectively heating the internal zone 110.

Thus, the first disclosed embodiments determine whether the heat pump 120, 125, 130 is effectively heating the internal zone 110 by determining whether it can increase the inside temperature $T_I$ of the internal zone 110 by the temperature increment $\Delta T$ over the course of the heating interval.

Monitoring Operation of the Heat Pump—Second Disclosed Embodiments

Figure 4:
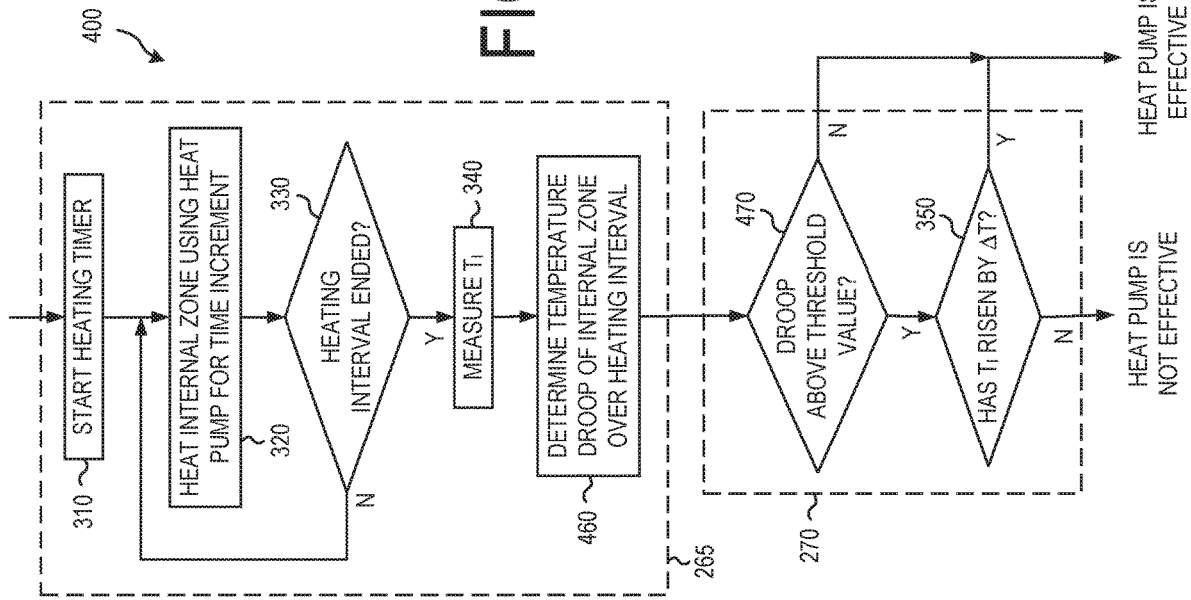
FIG. 4 is a flow chart showing the operations of monitoring the operation of the heat pump and determining whether the heat pump is still effective in heating the internal zone according to second disclosed embodiments.

FIG. 4 is a flow chart 400 showing the operations of monitoring the operation of the heat pump 120, 125, 130 and determining whether the heat pump 120, 125, 130 is still effective in heating the internal zone 110 according to second disclosed embodiments:

As shown in FIG. 4, the process of monitoring the operation of the heat pump 120, 125, 130 (265) begins by starting a heating timer. (310) This heating timer may be internal to a system controller 180 or could be a separate clock circuit.

After starting the heating timer (310), the operation 265 heats the internal zone 110 using a heat pump 120, 125, 130 for a time increment. (320) This time increment may be of a different duration than the time increment used in operation 250.

After the end of the time increment, the operation 265 determines whether a heating interval has ended. (330) The heating interval is typically made up of multiple time increments.

If the heating interval has not ended, the operation 265 heats the internal zone 110 using the heat pump 120, 125, 130 for another time increment (320) and again determines whether the heating interval has ended (330).

If, however, the heating interval has ended, the operation 265 measures a current value for the inside temperature $T_I$. (340) This current inside temperature $T_I$ can be measured by an indoor temperature sensor 160 and can be stored in a memory 190. This current inside temperature $T_I$ can be stored in the memory 190 in addition to a previous inside temperature $T_I$ already stored in the memory 190.

These operations 310, 320, 330, 340 are comparable to operations 310, 320, 330, 340 performed in the first disclosed embodiments described above with respect to FIG. 3. The description of these operations 310, 320, 330, 340 from the first disclosed embodiments of FIG. 3 also apply to the second disclosed embodiments of FIG. 4.

In addition, the operation 265 also determines a temperature droop of the internal zone 110 over the heating interval. (460) A backup heat droop is the temperature difference between a setpoint temperature and a current temperature at which backup heat would come on. In the disclosed embodiments, backup heat is the heat from sources other than the heat pump 120, 125, 130, i.e., the auxiliary heater 140. For example, if the system had a 2° F. droop and the setpoint was 70° F., then the backup heat would be activated at 68° F. The temperature droop may vary over time.

The operation of determining whether the heat pump 120, 125, 130 is effectively heating the internal zone 110 (270) is implemented by first determining whether the temperature droop over the heating interval is not above a threshold droop value. (470) If the operation 470 determines that the temperature droop is not above the threshold value, then it is determined that the heat pump 120, 125, 130 is effective in heating the internal zone 110.

If, however, it is determined that temperature droop over the heating interval is above the threshold droop value, the operation 270 then determines whether the value of the inside temperature $T_I$ has risen by a given temperature increment $\Delta T$ over the course of the heating interval. (350) In other words, the operation 270 determines whether $(T_{I-POST}-T_{I-PRE}) \geq \Delta T$. This essentially determines whether the heat pump 120, 125, 130 has been able to raise the temperature in the internal zone 110 by the at least the temperature increment $\Delta T$ over the heating interval.

As noted above, the temperature increment $\Delta T$ may be between 0.5° C. and 3° C. in various embodiments. However, this is by way of example only. Alternate embodiments can use a temperature increment $\Delta T$ that is lower than 0.5° C. or higher than 3° C. Furthermore, the temperature increment $\Delta T$ may vary depending upon what the heating interval is. A longer heating interval may require a higher temperature increment $\Delta T$ to prove that the heat pump 120, 125, 130 is effectively heating the internal zone 110.

If the inside temperature $T_I$ has risen by the temperature increment $\Delta T$ over the course of the heating interval, then it is determined that the heat pump 120, 125, 130 is effectively heating the internal zone 110. If, however, the inside temperature $T_I$ has not risen by the temperature increment $\Delta T$ over the course of the heating interval, then it is determined that the heat pump 120, 125, 130 is not effectively heating the internal zone 110.

Thus, the second disclosed embodiments determine whether the heat pump 120, 125, 130 is effectively heating the internal zone 110 by determining first whether the temperature droop over the heating interval is less than or equal to the droop threshold, and second whether the heat pump 120, 125, 130 can increase the inside temperature $T_I$ of the internal zone 110 by the temperature increment $\Delta T$ over the course of the heating interval. The heat pump 120, 125, 130 is considered to be effective if either the temperature droop over the heating interval is less than or equal to the threshold droop or if the heat pump 120, 125, 130 is able to raise the inside temperature $T_I$ of the internal zone 110 by at least the temperature increment ΔT over the course of the heating interval. Otherwise, the heat pump 120, 125, 130 is determined to be not effective.

Monitoring Operation of the Heat Pump—Third Disclosed Embodiments

Figure 5:
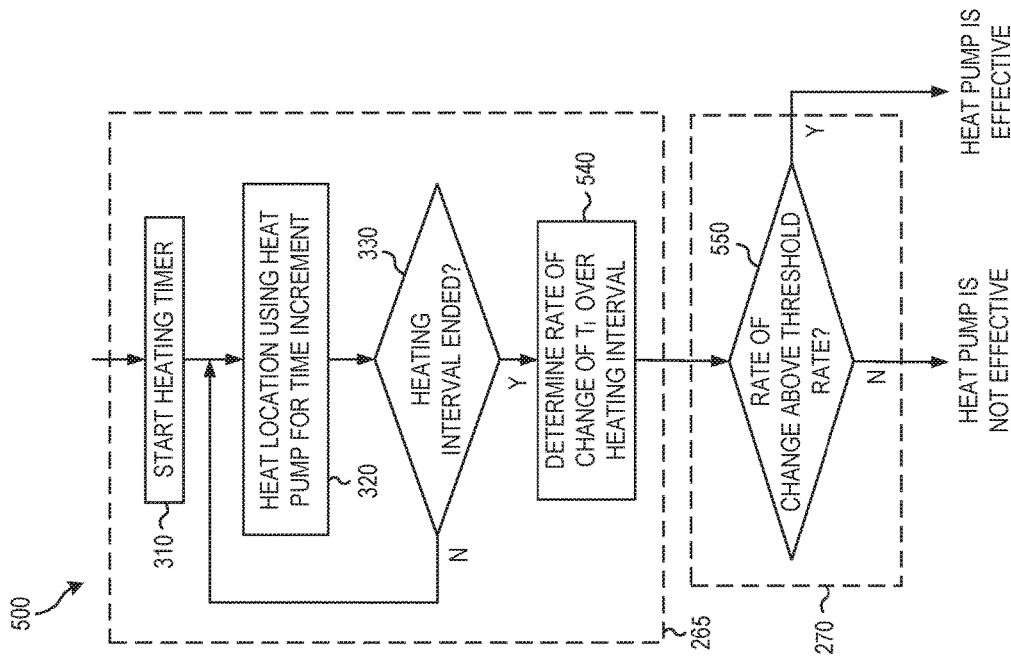
FIG. 5 is a flow chart showing the operations of monitoring the operation of the heat pump and determining whether the heat pump is still effective in heating the internal zone according to third disclosed embodiments.

FIG. 5 is a flow chart 500 showing the operations of monitoring the operation of the heat pump 120, 125, 130 and determining whether the heat pump 120, 125, 130 is still effective in heating the internal zone 110 according to third disclosed embodiments;

As shown in FIG. 5, the process of monitoring the operation of the heat pump 120, 125, 130 (265) begins by starting a heating timer. (310) This heating timer may be internal to a system controller 180 or could be a separate clock circuit.

After starting the heating timer (310), the operation 265 heats the internal zone 110 using a heat pump 120, 125, 130 for a time increment. (320) This time increment may be of a different duration than the time increment used in operation 250.

After the end of the time increment, the operation 265 determines whether a heating interval has ended. (330) The heating interval is typically made up of multiple time increments.

If the heating interval has not ended, the operation 265 heats the internal zone 110 using the heat pump 120, 125, 130 for another time increment (320) and again determines whether the heating interval has ended (330).

If, however, the heating interval has ended, the operation 265 determines a rate of change for the inside temperature $T_I$ over the heating interval. (540) This operation 540 can include measuring a current value for the inside temperature $T_I$ by an indoor temperature sensor 160, reading a previous value for the inside temperature $T_I$ from stored in a memory 190, subtracting the pre-heating-interval value of the for the inside temperature ($T_{I\text{-}PRE}$) from the post-heating-interval value for the inside temperature ($T_{I\text{-}POST}$), and dividing the difference by the heating interval (Δt). In other words, the operation 540 determines the rate of change of the inside temperature $T_I$ to be $(T_{I\text{-}POST} - T_{I\text{-}PRE})/\Delta t$.

The operations 310, 320, 330 are comparable to operations 310, 320, 330 performed in the first disclosed embodiments described above with respect to FIG. 3. The description of these operations 310, 320, 330 from the first disclosed embodiments of FIG. 3 also apply to the third disclosed embodiments of FIG. 5.

The operation of determining whether the heat pump 120, 125, 130 is effectively heating the internal zone 110 (270) is implemented by determining whether the rate of change of the inside temperature $T_I$ over the heating interval (Δt) is greater than a threshold rate of change. (350) This essentially determines whether the heat pump 120, 125, 130 is heating the internal zone 110 quickly enough over the heating interval.

If the rate of change of the inside temperature $T_I$ is greater than a threshold rate of change over the course of the heating interval, then it is determined that the heat pump 120, 125, 130 is effectively heating the internal zone 110. If, however, the rate of change of the inside temperature $T_I$ is not greater than the threshold rate of change over the course of the heating interval, then it is determined that the heat pump 120, 125, 130 is not effectively heating the internal zone 110.

Thus, the third disclosed embodiments determine whether the heat pump 120, 125, 130 is effectively heating the internal zone 110 by determining whether it can increase the inside temperature $T_I$ of the internal zone 110 quickly enough over the course of the heating interval.

Monitoring Operation of the Heat Pump—Fourth Disclosed Embodiments

Figure 6:
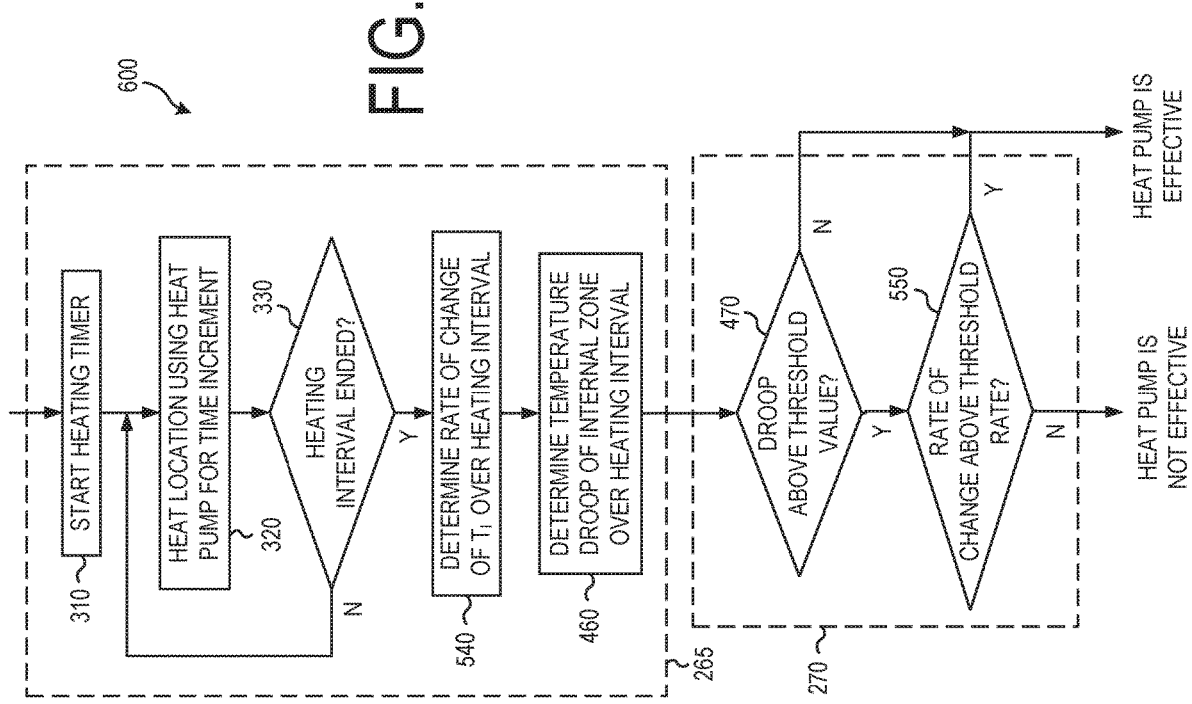
FIG. 6 is a flow chart showing the operations of monitoring the operation of the heat pump and determining whether the heat pump is still effective in heating the internal zone according to fourth disclosed embodiments.

FIG. 6 is a flow chart 600 showing the operations of monitoring the operation of the heat pump 120, 125, 130 and determining whether the heat pump 120, 125, 130 is still effective in heating the internal zone 110 according to fourth disclosed embodiments.

As shown in FIG. 6, the process of monitoring the operation of the heat pump 120, 125, 130 (265) begins by starting a heating timer. (310) This heating timer may be internal to a system controller 180 or could be a separate clock circuit.

After starting the heating timer (310), the operation 265 heats the internal zone 110 using a heat pump 120, 125, 130 for a time increment. (320) This time increment may be of a different duration than the time increment used in operation 250.

After the end of the time increment, the operation 265 determines whether a heating interval has ended. (330) The heating interval is typically made up of multiple time increments.

If the heating interval has not ended, the operation 265 heats the internal zone 110 using the heat pump 120, 125, 130 for another time increment (320) and again determines whether the heating interval has ended (330).

If, however, the heating interval has ended, the operation 265 determines a rate of change for the inside temperature $T_I$ over the heating interval. (540) This operation 540 can include measuring a current value for the inside temperature $T_I$ by an indoor temperature sensor 160, reading a previous value for the inside temperature $T_I$ from stored in a memory 190, subtracting the pre-heating-interval value of the for the inside temperature ($T_{I\text{-}PRE}$) from the post-heating-interval value for the inside temperature ($T_{I\text{-}POST}$), and dividing the difference by the heating interval (Δt). In other words, the operation 540 determines the rate of change of the inside temperature $T_I$ to be $(T_{I\text{-}POST} - T_{I\text{-}PRE})/\Delta t$.

In addition, the operation 265 also determines a temperature droop of the internal zone 110 over the heating interval. (460)

The operations 310, 320, 330 are comparable to operations 310, 320, 330 performed in the first disclosed embodiments described above with respect to FIG. 3; the operation 460 is comparable to operation 460 performed in the second disclosed embodiments described above with respect to FIG. 4; and the operation 540 is comparable to operation 540 performed in the third disclosed embodiments described above with respect to FIG. 5. The description of these operations 310, 320, 330, 460, 540 from the first, second, and third disclosed embodiments of FIGS. 3-5 also apply to the fourth disclosed embodiments of FIG. 6.

The operation of determining whether the heat pump 120, 125, 130 is effectively heating the internal zone 110 (270) is implemented by first determining whether the temperature droop over the heating interval is not above a threshold droop value. (470) If the temperature droop is not above the threshold value, then it is determined that the heat pump 120, 125, 130 is effective in heating the internal zone 110.

If, however, it is determined that temperature droop over the heating interval is above the threshold droop value, the operation 270 then determines whether the rate of change of the inside temperature $T_I$ is greater than a threshold rate of change over the course of the heating interval. (550) This essentially determines whether the heat pump 120, 125, 130 has been able to raise the temperature in the internal zone 110 quickly enough over the heating interval.

If the rate of change of the inside temperature $T_I$ is greater than the threshold rate of change over the course of the heating interval, then it is determined that the heat pump 120, 125, 130 is effectively heating the internal zone 110. If, however, the rate of change of the inside temperature $T_I$ is not above the threshold rate of change over the course of the heating interval, then it is determined that the heat pump 120, 125, 130 is not effectively heating the internal zone 110.

Thus, the fourth disclosed embodiments determine whether the heat pump 120, 125, 130 is effectively heating the internal zone 110 by determining first whether the temperature droop over the heating interval is less than or equal to the droop threshold, and second whether the heat pump 120, 125, 130 can increase the inside temperature $T_I$ of the internal zone 110 quickly enough over the course of the heating interval. The heat pump 120, 125, 130 is considered to be effective if either the temperature droop over the heating interval is less than or equal to the threshold droop or if the rate of change of the inside temperature $T_I$ of the internal zone 110 over the course of the heating interval is high enough. Otherwise, the heat pump 120, 125, 130 is determined to be not effective.

Monitoring Operation of the Heat Pump—Fifth Disclosed Embodiments

Figure 7:
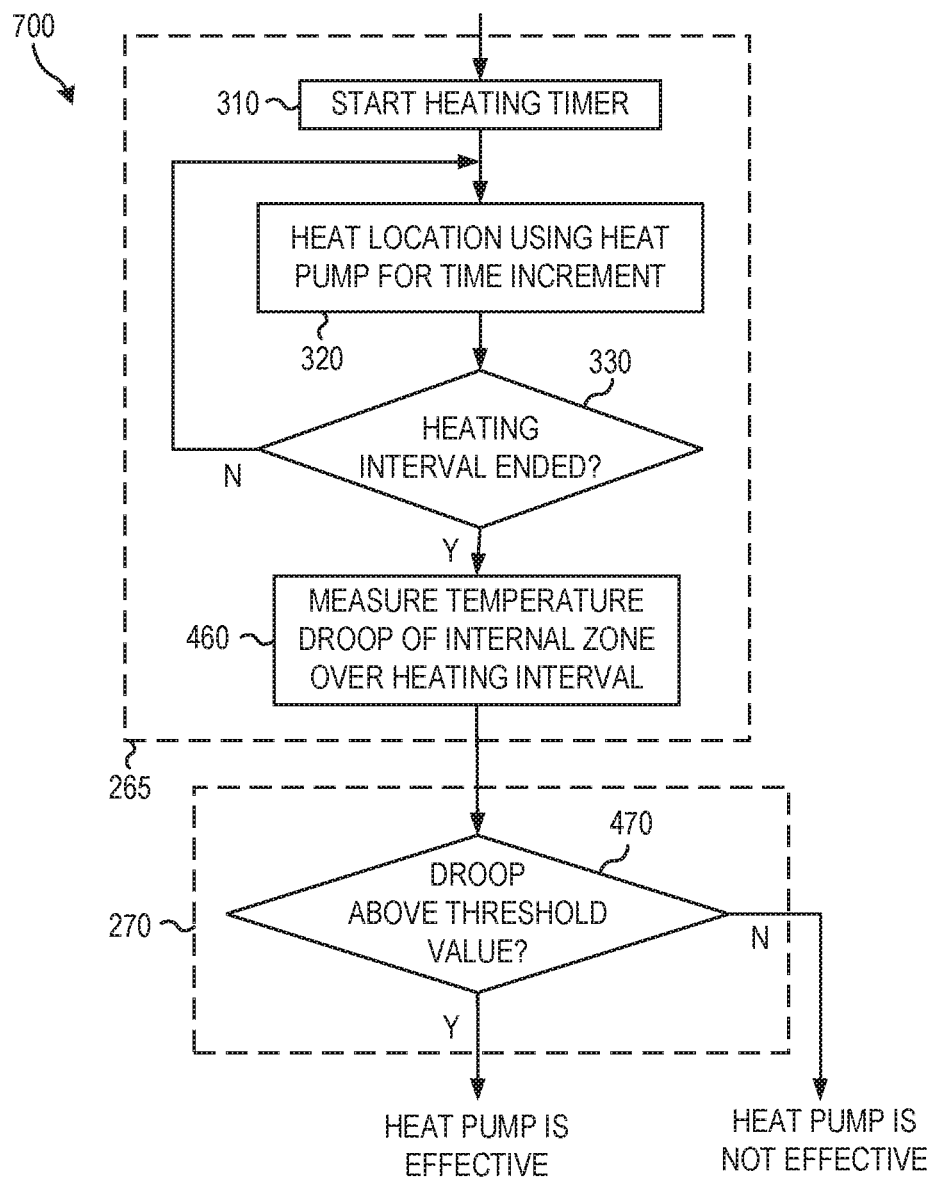
FIG. 7 is a flow chart showing the operations of monitoring the operation of the heat pump and determining whether the heat pump is still effective in heating the internal zone according to fifth disclosed embodiments.

FIG. 7 is a flow chart 700 showing the operations of monitoring the operation of the heat pump 120, 125, 130 and determining whether the heat pump 120, 125, 130 is still effective in heating the internal zone 110 according to fifth disclosed embodiments.

As shown in FIG. 7, the process of monitoring the operation of the heat pump 120, 125, 130 (265) begins by starting a heating timer. (310) This heating timer may be internal to a system controller 180 or could be a separate clock circuit.

After starting the heating timer (310), the operation 265 heats the internal zone 110 using a heat pump 120, 125, 130 for a time increment. (320) This time increment may be of a different duration than the time increment used in operation 250.

After the end of the time increment, the operation 265 determines whether a heating interval has ended. (330) The heating interval is typically made up of multiple time increments.

If the heating interval has not ended, the operation 265 heats the internal zone 110 using the heat pump 120, 125, 130 for another time increment (320) and again determines whether the heating interval has ended (330).

If, however, the heating interval has ended, the operation 265 determines a temperature droop of the internal zone 110 over the heating interval. (460)

The operations 310, 320, 330 are comparable to operations 310, 320, 330 performed in the first disclosed embodiments described above with respect to FIG. 3; and the operation 460 is comparable to operation 460 performed in the second disclosed embodiments described above with respect to FIG. 4. The description of these operations 310, 320, 330, 460 from the first and second disclosed embodiments of FIGS. 3 and 4 also apply to the fifth disclosed embodiments of FIG. 7.

The operation of determining whether the heat pump 120, 125, 130 is effectively heating the internal zone 110 (270) is implemented by determining whether the temperature droop over the heating interval is not above a threshold droop value. (470) if the temperature droop is not above the threshold value, then it is determined that the heat pump 120, 125, 130 is effective in heating the internal zone 110.

If, however, it is determined that temperature droop over the heating interval is above the threshold droop value, the operation 270 then is determined that the heat pump 120, 125, 130 is not effectively heating the internal zone 110.

Thus, the fifth disclosed embodiments determine whether the heat pump 120, 125, 130 is effectively heating the internal zone 110 by determining whether the temperature droop over the heating interval is less than or equal to the droop threshold. The heat pump 120, 125, 130 is considered to be effective if the temperature droop over the heating interval is less than or equal to the threshold droop. Otherwise, the heat pump 120, 125, 130 is determined to be not effective.

Alternate Embodiments

Although FIGS. 3-7 disclose different ways of determining whether the heat pump 120, 125, 130 is effectively heating the internal zone 110, and employs different combinations of these determination operations, this is by way of example only. Alternate embodiments can mix and match the disclosed determination operations in other combinations. For example, one embodiment could determine both whether the inside temperature $T_I$ has risen by a temperature increment $\Delta T$ over the heating interval and whether the rate of change of the inside temperature $T_I$ over the heating interval is greater than a threshold rate of change in determining whether the heat pump 120, 125, 130 is effectively heating the internal zone 110 at the current outside temperature $T_O$. Other combinations are possible.

In addition, although FIGS. 3, 5, and 7 show the use of a single parameter in determining whether the heat pump 120, 125, 130 is effectively heating the internal zone 110 and FIGS. 4 and 6 show the use of two parameters in determining whether the heat pump 120, 125, 130 is effectively heating the internal zone 110, this is by way of example only. Alternate embodiments could use three or more parameters in determining whether the heat pump 120, 125, 130 is effectively heating the internal zone 110.

Furthermore, when multiple parameters are used to determine whether the heat pump 120, 125, 130 is effectively heating the internal zone 110, these parameters can be used conjunctively or disjunctively in different embodiments. For example, if operation 270 determines both whether the inside temperature $T_I$ has risen by a temperature increment $\Delta T$ over the heating interval and whether the rate of change of the inside temperature $T_I$ over the heating interval is greater than a threshold rate of change, it may determine that the heat pump 120, 125, 130 is effectively heating the internal zone 110 only if both criteria are met in one set of embodiments and is effectively heating the internal zone 110 if either criterion is met in another set of embodiments.

Implementation and Technical Notes

The above discussion has assumed that the reader has sufficient technical background to appreciate the points made. This section provides some supplementary implementation and/or technical notes which discuss some technical information that may be relevant.

The instant disclosure is provided to further explain in an enabling fashion the best modes of performing one or more embodiments. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a digital signal processor and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring principles and concepts, further discussion of such software and ICs, if any, will be limited to the essentials with respect to the principles and concepts used by the exemplary embodiments.

The various embodiments which demonstrate a method for controlling an HVAC system having both a heat pump and an auxiliary heater have been discussed in detail above. It should be further noted that the above-described processes can be stored as instructions in computer-readable storage medium. When the instructions are executed by a computer, for example after being loaded from a computer-readable storage medium, the process(es) are performed. The detailed descriptions, which appear herein, may be presented in terms of program procedures executed on a computer or a network of computers. These procedural descriptions and representations herein are the means used by those skilled in the art to most effectively convey the substance of their work to others skilled in the art.

A procedure is generally conceived to be a self-consistent sequence of steps leading to a desired result. These steps are those requiring physical manipulations of physical quantities. Usually, though not necessarily, these quantities take the form of electrical or magnetic signals capable of being stored on non-transitory computer-readable media, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms such as adding, determining, or comparing, which are commonly associated with mental operations performed by a human operator. While the discussion herein may contemplate the use of an operator, a human operator is not necessary, or desirable in most cases, to perform the actual functions described herein; the operations are machine operations.

Various computers or computer systems may be programmed with programs written in accordance with the teachings herein, or it may prove more convenient to construct a more specialized apparatus to perform the required method steps. The required structure for a variety of these machines will be apparent from the description given herein.

A computer-readable storage medium is tangible and non-transitory; a computer-readable storage medium can be any of the memory or storage devices, such as those examples described above, or other removable or fixed storage medium, provided such computer-readable storage medium is tangible and non-transitory.

Furthermore, any communication between elements in the disclosed HVAC system 100 in an embodiment can include, by way of example but not limitation, data and/or packet communications networks, which can provide wireless communications capability and/or use wireline connections such as cable and/or a connector, or similar. Any appropriate communication protocol may be used between the disclosed elements.

CONCLUSION

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled. The various circuits described above can be implemented in discrete circuits or integrated circuits, as desired by implementation.

What is claimed:

1. A computer-implemented method of controlling a heating, ventilation, and air-conditioning (HVAC) system having a heat pump and an auxiliary heater to heat an inside zone during a heating mode, the method comprising:
   setting values for an economic balance point and a temperature set point;
   setting a capacity balance point to be equal to the economic balance point;
   measuring an initial inside temperature in the inside zone and an outside temperature outside of a structure containing the inside zone;
   determining that the initial inside temperature is lower than the temperature set point;
   determining that the outside temperature is greater than the capacity balance point;
   activating the heat pump to heat the inside zone;
   waiting a heating interval while the heat pump is active;
   determining that the heat pump is not effective in heating the inside zone; and
   in response to the determining that the heat pump is not effective in heating the inside zone, setting the capacity balance point to be equal to the outside temperature.

2. The method of claim 1, further comprising:
   repeatedly performing the operations of measuring the initial inside temperature and the outside temperature, determining that the initial inside temperature is lower than the temperature set point, determining that the outside temperature is greater than the capacity balance point, activating the heat pump to heat the inside zone, waiting the heating interval while the heat pump is active, determining that the heat pump is not effective in heating the inside zone, and setting the capacity balance point to be equal to the outside temperature.

3. The method of claim 1, further wherein the heating interval is between 10 minutes and 30 minutes.

4. The method of claim 1, further wherein the auxiliary heater is one of a natural gas furnace, a propane furnace, an oil furnace, an electric heater, a boiler, a radiant heater, and a baseboard heater.

5. The method of claim 1, further comprising:
resetting a correction timer;
determining that a correction time has expired on the correction timer;
determining that the capacity balance point is higher than the economic balance point after determining that the correction time has expired; and
decreasing the capacity balance point by a temperature increment to a minimum of the economic balance point after determining that the capacity balance point is higher than the economic balance point.

6. The method of claim 5, further comprising:
repeating the operations of resetting the correction timer, determining that the correction time has expired, determining that the capacity balance point is higher than the economic balance point, and decreasing the capacity balance point by a temperature increment.

7. The method of claim 5, wherein the correction time is between 3 and 24 hours.

8. The method of claim 5, wherein the temperature increment is between 0.5° C. and 3° C.

9. The method of claim 1, wherein the operation of determining that the heat pump is not effective in heating the inside zone includes:
measuring a revised inside temperature of the inside zone after the heat pump has been active for the heating interval;
determining a temperature difference between the revised inside temperature and the initial inside temperature; and
determining that the temperature difference is lower than a threshold difference.

10. The method of claim 1, wherein the operation of determining that the heat pump is not effective in heating the inside zone includes:
measuring a revised inside temperature of the inside zone after the heat pump has been active for the heating interval;
determining a temperature rate of change from the initial inside temperature to the revised inside temperature; and
determining that the temperature rate of change is lower than a threshold rate of change.

11. The method of claim 1, wherein the operation of determining that the heat pump is not effective in heating the inside zone includes:
determining that a temperature droop for the air conditioning system in the inside zone after the heat pump has been active for the heating interval is greater than a threshold droop.

12. A non-transitory computer-readable medium comprising instructions for execution by a computer, the instructions including a computer-implemented method for controlling a heating, ventilation, and air-conditioning (HVAC) system having a heat pump and an auxiliary heater for heating an internal zone during a heating mode, the instructions for implementing:
setting values for an economic balance point and a temperature set point;
setting a capacity balance point to be equal to the economic balance point;
measuring an initial inside temperature in the inside zone and an outside temperature outside of a structure containing the inside zone;
determining that the initial inside temperature is lower than the temperature set point;
determining that the outside temperature is greater than the capacity balance point;
activating the heat pump to heat the inside zone;
waiting a heating interval while the heat pump is active;
determining that the heat pump is not effective in heating the inside zone; and
in response to the determining that the heat pump is not effective in heating the inside zone, setting the capacity balance point to be equal to the outside temperature.

13. The non-transitory computer-readable medium of claim 12, wherein the instructions are for further implementing:
repeatedly performing the operations of measuring the initial inside temperature and the outside temperature, determining that the initial inside temperature is lower than the temperature set point, determining that the outside temperature is greater than the capacity balance point, activating the heat pump to heat the inside zone, waiting the heating interval while the heat pump is active, determining that the heat pump is not effective in heating the inside zone, and setting the capacity balance point to be equal to the outside temperature.

14. The non-transitory computer-readable medium of claim 12, wherein the instructions are for further implementing:
resetting a correction timer;
determining that a correction time has expired on the correction timer;
determining that the capacity balance point is higher than the economic balance point after determining that the correction time has expired; and
decreasing the capacity balance point by a temperature increment to a minimum of the economic balance point after determining that the capacity balance point is higher than the economic balance point.

15. The non-transitory computer-readable medium of claim 12, wherein the operation of determining that the heat pump is not effective in heating the inside zone includes:
measuring a revised inside temperature of the inside zone after the heat pump has been active for the heating interval;
determining a temperature difference between the revised inside temperature and the initial inside temperature; and
determining that the temperature difference is lower than a threshold difference.

16. The non-transitory computer-readable medium of claim 12, wherein the operation of determining that the heat pump is not effective in heating the inside zone includes:
measuring a revised inside temperature of the inside zone after the heat pump has been active for the heating interval;
determining a temperature rate of change from the initial inside temperature to the revised inside temperature; and determining that the temperature rate of change is lower than a threshold rate of change.

17. The non-transitory computer-readable medium of claim 12, wherein the operation of determining that the heat pump is not effective in heating the inside zone includes:
    determining that the temperature droop for the air conditioning system in the inside zone after the heat pump has been active for the heating interval is greater than a threshold droop.

18. A computer system configured for controlling a heating, ventilation, and air-conditioning (HVAC) system having a heat pump and an auxiliary heater for heating an internal zone during a heating mode, the system comprising:
    a memory configured to store data and instructions; and
    a processor cooperatively operable with the memory, and configured to facilitate:
        setting values for an economic balance point and a temperature set point;
        setting a capacity balance point to be equal to the economic balance point;
        measuring an initial inside temperature in the inside zone and an outside temperature outside of a structure containing the inside zone;
        determining that the initial inside temperature is lower than the temperature set point;
        determining that the outside temperature is greater than the capacity balance point;
        activating the heat pump to heat the inside zone;
        waiting a heating interval while the heat pump is active;
        determining that the heat pump is not effective in heating the inside zone; and
        in response to the determining that the heat pump is not effective in heating the inside zone, setting the capacity balance point to be equal to the outside temperature.

19. The computer system as recited in claim 18, wherein the processor is further configured to facilitate:
    repeatedly performing the operations of measuring the initial inside temperature and the outside temperature, determining that the initial inside temperature is lower than the temperature set point, determining that the outside temperature is greater than the capacity balance point, activating the heat pump to heat the inside zone, waiting the heating interval while the heat pump is active, determining that the heat pump is not effective in heating the inside zone, and setting the capacity balance point to be equal to the outside temperature.

20. The computer system as recited in claim 18, wherein the processor is further configured to facilitate:
    resetting a correction timer;
    determining that a correction time has expired on the correction timer;
    determining that the capacity balance point is higher than the economic balance point after determining that the correction time has expired; and
    decreasing the capacity balance point by a temperature increment to a minimum of the economic balance point after determining that the capacity balance point is higher than the economic balance point.

* * * * *